Dec. 17, 1957 F. C. WILLIAMS ET AL 2,817,042

ELECTROSTATIC STORAGE OF INFORMATION

Filed Jan. 7, 1952 3 Sheets-Sheet 1

Inventors:
F. C. Williams
Tom Kilburn
By Moore & Hall
Attorneys

INVENTORS:
F. C. WILLIAMS
Tom KILBURN
By Moore and Hall
Attorneys

Dec. 17, 1957 F. C. WILLIAMS ET AL 2,817,042

ELECTROSTATIC STORAGE OF INFORMATION

Filed Jan. 7, 1952 3 Sheets-Sheet 3

Inventors:
F. C. WILLIAMS
TOM KILBURN
By Moore & Hall
Attorneys

United States Patent Office 2,817,042

Patented Dec. 17, 1957

2,817,042

ELECTROSTATIC STORAGE OF INFORMATION

Frederic C. Williams, Timperley, and Tom Kilburn, Davyhulme, Manchester, England, assignors to National Research Development Corporation, London, England Application January 7, 1952, Serial No. 265,346

Claims priority, application Great Britain January 9, 1951

12 Claims. (Cl. 315—12)

Figure 1:
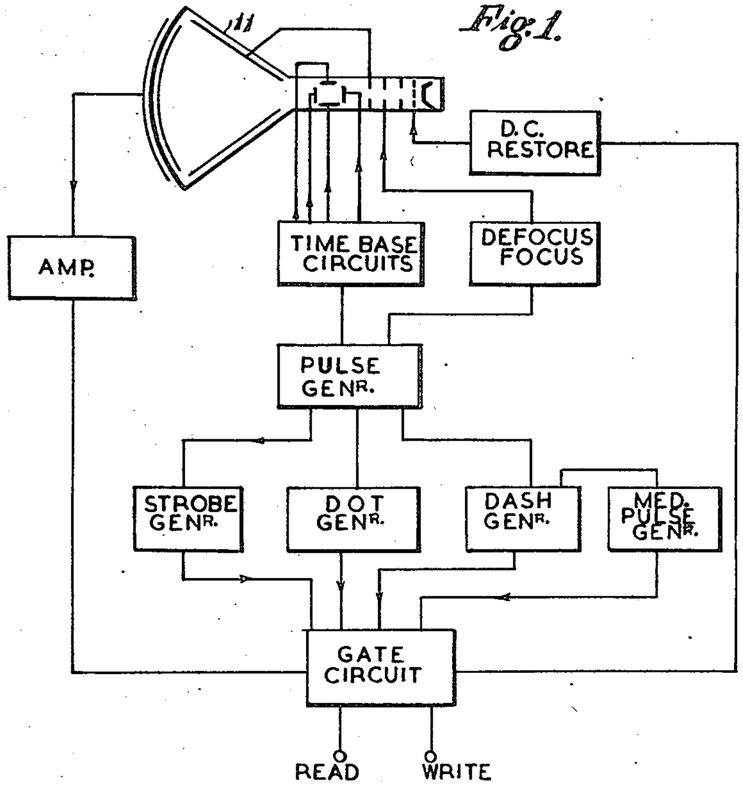

The present invention relates to electrostatic storage of information.

The specifications of patent applications Nos. 50,136 and 124,192 describe a storge system in which elements of binary information are stored as one of two conditions of charge distribution over discrete areas of the insulating screen or storage surface of a cathode ray tube. The recording of each element of information by bombardment of the recording area by the electron beam of the tube is effected by either one or both of two distinct phases of bombardment. During the first or reading phase an area on which information is stored is bombarded by a defocused beam to produce a stable positive charge, as a result of secondary emission. During this first or reading phase the nature of the pre-existing charge distribution over the area and thus the nature of the stored digit is detected. During the second or modifying phase, the cathode ray beam is either suppressed or is caused by focusing to illuminate only a small area within the outer boundaries of the initial larger defocused spot area with the result that secondary emission from the focused spot area causes whole or partial cancellation of the positive charge on the area of the initial defocused spot not covered by the focused spot. The choice made from the two alternatives in this second phase is dependent upon the nature of the digit to be recorded.

This defocus-focus method ideally has considerable advantages over other methods of effecting electrostatic storage such as the gap-trace dot-dash and double-dot methods described in the specifications of copending patent applications Nos. 790,879 and 50,136. In all methods of operating electrostatic storage apparatus described in the aforesaid specifications the signals which carry the intelligence indicative of the digit stored are derived during the initial exploratory phase of bombardment of the digit area and the signal derived is a measure of the positive charge which is created during this phase. Thus it is desirable that as large an area as possible of the area of recording surface allocated to each digit should contribute to this charge and when cancellation of the charge is effected that the efficiency of cancellation of this charge by the secondary emission produced by the succeeding phase of bombardment should be high. The defocus-focus method of operation is potentially more efficient than the other methods referred to, in the following respects: (i) the area carrying a charge which contributes to the signals is in the ideal case the annular area formed by the subtraction of the focused spot area from the defocused spot area and ideally the ratio of defocused to focused spot areas may be such that a large proportion of the total digit area is effective for the production of signal; (ii) as the fixed spot is in theory centrally situated within the digit area, the process of refilling or of cancellation of the positive charge is efficient, as secondary electrons ejected in all radial directions can contribute to the refilling process; and (iii) the spacing of the source of refilling secondary electrons from the positive charge area does not change during the process as it does in the dot-dash method of operation.

A further major advantage of the defocus-focus system over the other systems referred to lies in its increased protection against spurious effects which prevent the correct operation of the storage system and make storage at some spots on the recording surface impossible. These spurious effects are believed to arise from imperfections in the recording surface which result in small areas having a secondary emission ratio less than 1 under the operating conditions so that they acquire negative charges during the scanning process. If one of these negatively charged areas lies between the positive charge created by an initial reading phase of bombardment and the source of refilling secondary electrons, the cancellation or refilling process is prevented. It will be apparent that the defocus-focus method of operation provides a measure of protection against such effects by virtue of the fact that the refilling or cancelling process occurs by the outward movement of secondary electrons from the central spot and that only in the unlikely event of a configuration of defective area of screen which prevents the passage of the majority of the radially moving secondary electrons will some measure of charge cancellation be impossible.

It is difficult to achieve the theoretical advantages of the defocus-focus method in practice, however, as owing to the imperfect focusing characteristics of the cathode ray tube the ideal configuration of circular defocused spot and centrally positioned focused spot cannot readily be achieved at all deflected positions of the cathode ray beam. In actual fact although such a configuration may be fairly readily achieved near the centre of the screen, towards the outside of the screen the defocused spot may degenerate from the circular into an elongated or other form, and in the worst conditions the deflected focused and defocused spots may be distinct and separate. The theoretical advantages of the defocus-focus method may thus disappear and in bad cases the separation of the two spot areas might be such that any storage phenomenon is prevented.

An object of the present invention is to provide an improved method and means whereby these practical difficulties can be substantially overcome.

According to the present invention a method of storing information in a cathode ray tube storage device, comprises the steps of setting up on an electrostatic storage surface within the tube a first state of electrostatic charge distribution upon an area of the surface by bombarding the said area with the cathode ray beam in a first state of focus and subsequently progressively changing the state of focus of the beam from the first state to a second state, the beam when in the second state of focus being more sharply focused than when in the first state of focus. The first state of focus is that usually referred to as the defocused state and the second state is that usually referred to as the focused state. The spot passes through all the intermediate states of focus between the defocused and focused states over an appreciable time whereby storage is effected even if the electron-optical characteristics of the cathode ray tube are such that the positions of the focused and defocused spots would prevent storage from being effected if the change from the defocused to the focused states were made abruptly.

Further according to the invention apparatus for the electrostatic storage of information comprises an electrostatic storage surface contained in an evacuated envelope with means for producing an electron beam at a velocity such that when the beam strikes the said surface the number of electrons liberated is greater than the number of primary electrons arriving, means for directing the beam at recurring instants towards an area of the surface, means for controlling the beam to cause it to perform, according to the information to be stored, one of two sequences of bombardment, namely (I) bombardment of the area whilst in a first state of focus and (II) bombardment of the area whilst in the said first state of focus followed by a further bombardment during which there is effected a progressive change in the state of focus from the said first state to a second state in which the beam is more sharply focused than when in the first state of focus, the progressive change in the state of focus in procedure II serving to decrease the positive charge on the said area, and a pick-up plate associated with the said surface and adapted to have generated thereon, when the beam whilst in the first state of focus is directed upon the said area, a voltage representative of the state of charge of the said area, the said controlling means comprising an electrode or a system of electrodes of the cathode ray tube and a circuit for applying to such electrode or system of electrodes a voltage which progressively changes during the sequence (II).

The progressive change in focus occupies a time which is a substantial fraction of the duration of the said further bombardment in the sequence (II). This fraction should be at least one-fifth and may be about one-half.

Figure 2:
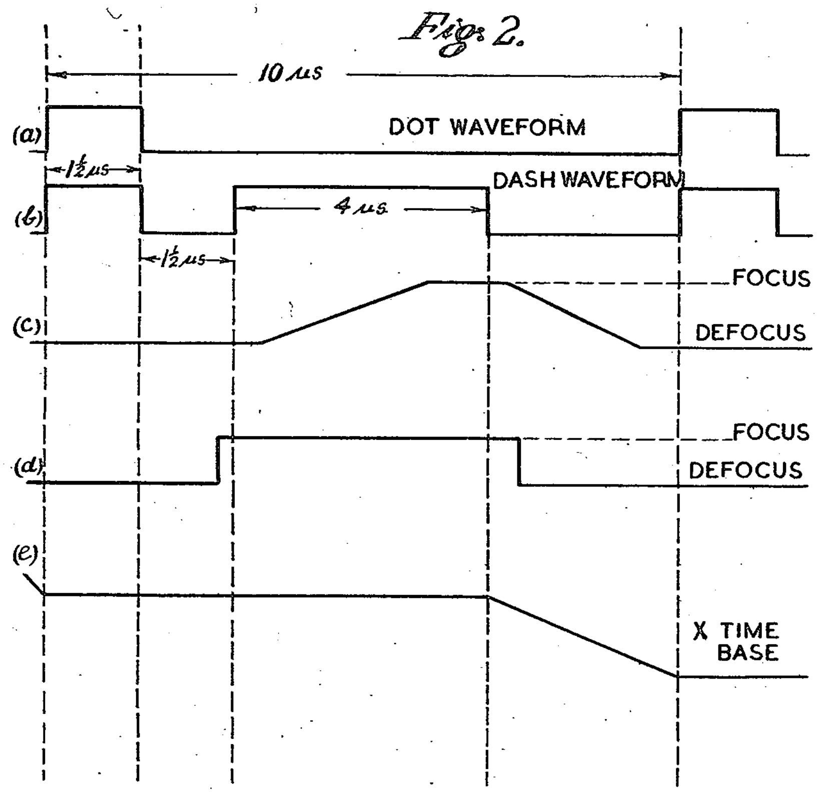
Figure 4:
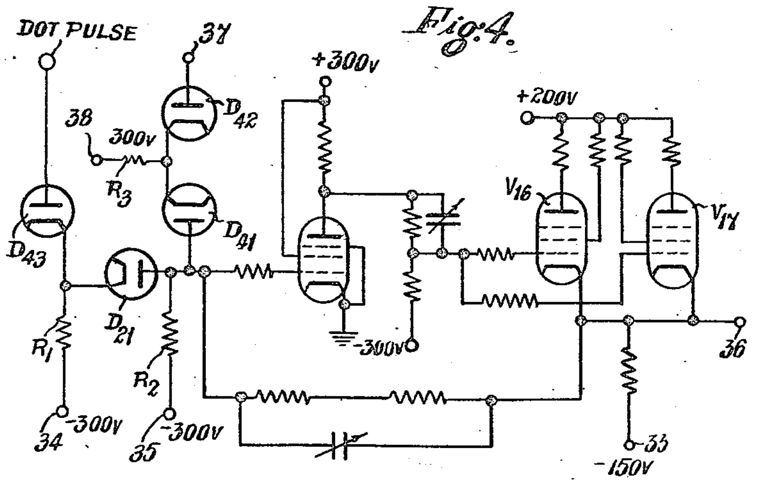
Figure 3:
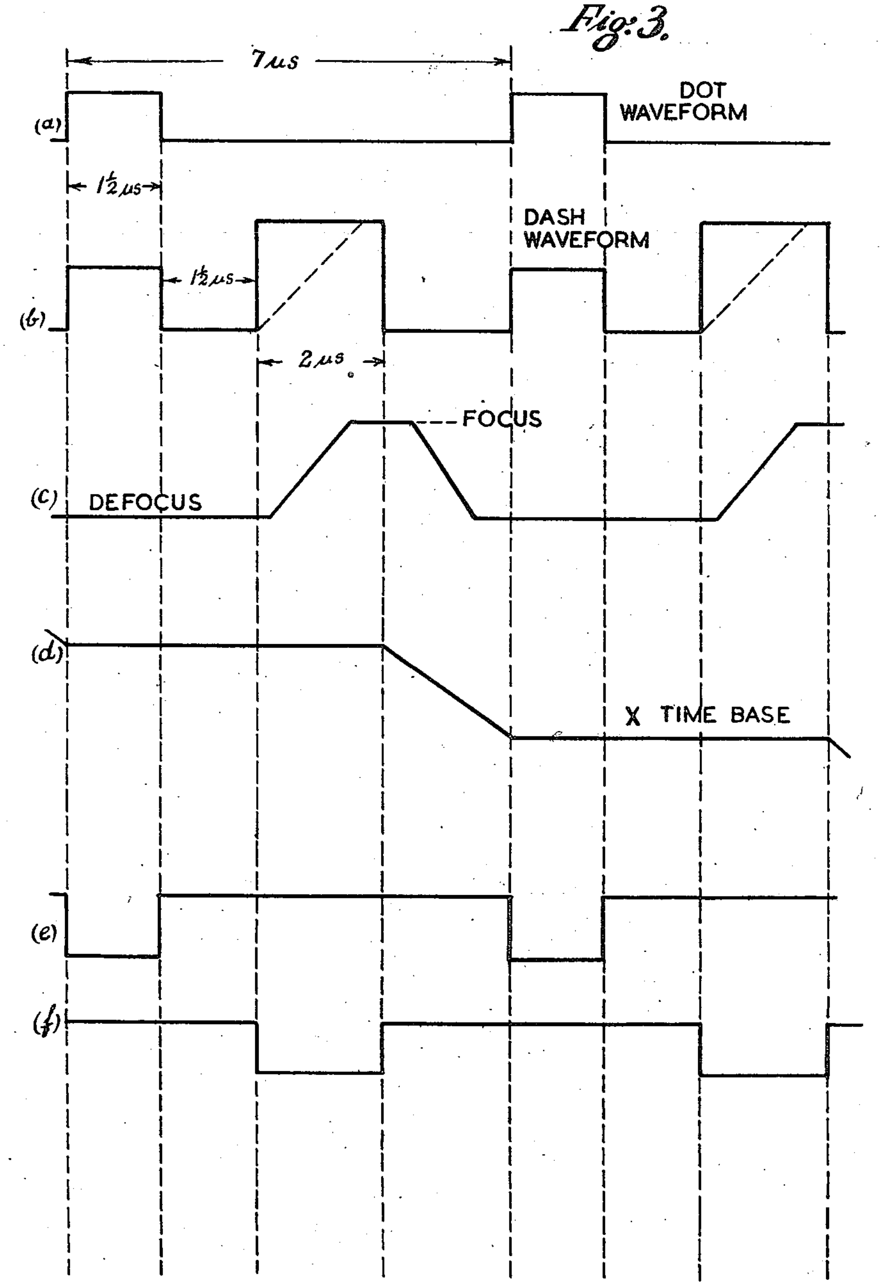

The invention will now be described by way of example with reference to the accompanying drawings in which, Figure 1 is a block schematic diagram of one embodiment of the invention, Figure 2 is an explanatory diagram showing voltage waveforms, Figure 3 is a circuit diagram of an arrangement for producing a waveform shown in Figure 4, and Figure 4 is an explanatory diagram showing further voltage waveforms.

Referring to Figure 1, this is a block diagram of a storage system substantially the same as a defocus-focus system described in the specification of patent application No. 124,192, filed October 28, 1949 by Frederic C. Williams and Tom Kilburn, the difference between the system shown in Figure 1 and that described in the specification of application No. 124,192 lying in the waveform of the focusing control voltage as will be described later. As the majority of the system shown in Figure 1 has already been described in co-pending application No. 124,192 a detailed description will not be given in the present specification.

The cathode ray beam in the tube 11 is controlled during the reading phase by a waveform usually referred to as the dot waveform. An example of this waveform is shown in Figure 2(*a*) and comprises pulses of 1.5 microseconds duration recurring over 10 microseconds, the duration of these pulses being sufficient to produce a suitable charge condition on the bombarded storage area. If during the second or modifying phase the digit to be stored requires modification of the first produced charge condition the beam is again switched-on as indicated by the 4 microseconds pulse shown in Figure 2(*b*). An interval of 1.5 microseconds between the end of a dot pulse and the commencement of the 4 microseconds pulse in the waveform of Figure 2(*b*) may be produced by the application of a suitable meditation pulse as described in the specification of co-pending patent application No. 165,262, now Patent No. 2,769,935, issued November 6, 1956. The waveform shown in Figure 2(*b*) will be referred to as the dash waveform.

Throughout the period occupied by a dash pulse and a succeeding meditation pulse and 4 microseconds dash pulse no movement of the cathode ray beam takes place as is indicated by the X time base waveform shown in Figure 2(*e*). The waveform of the focusing control voltage used in the systems described in the aforesaid patent specifications relating to defocus-focus systems is as shown in Figure 2(*d*). It will be seen from Figure 2(*d*) that the waveform is such that throughout each dot pulse and a part of the next succeeding meditation pulse the beam is in a defocused condition and that before the commencement of the 4 microseconds dash pulse the beam is focused. Thus whenever the beam is switched-on to modify the state of charge on a storage area it is in a focused condition. The beam is maintained in this condition until after the end of the 4 microseconds dash pulse whereby the beam remains focused throughout this 4 microseconds period.

In the present embodiment the waveform of Figure 2(*d*) is replaced by the waveform of Figure 2(*c*) which is such that the beam remains in a defocused condition until after the commencement of the 4 microseconds dash period and then progressively changes from the defocused condition to the focused condition during the 4 microseconds dash period, the beam becoming sharply focused before the end of the 4 microseconds dash period. As shown in Fig. 2(*c*), the progressive change in focus occupies a substantial fraction of the dash interval during which modification of the charge condition on a storage area takes place when required by the nature of the digit to be stored. This fraction should be at least one-fifth, and may be about one-half.

The manner in which the waveform of Figure 2(*c*) can be produced will be so readily understood by those skilled in the art that it is not considered necessary to describe suitable apparatus for the generation of this waveform. The precise waveform shown in Figure 2(*c*) need not of course be used and any waveform which is such that the beam is defocused for a period embracing the dot pulse and is defocused at the commencement of the 4 microseconds dash pulse and thereafter progressively becomes focused reaching the focused condition before the end of the dash pulse, is suitable. Furthermore, although the trailing edge of the defocused-focused pulse is shown to be substantially symmetrical with the leading edge this need not be so. The shape of the trailing edge is immaterial so long as the waveform reaches the defocused value before the commencement of the next dot pulse.

Referring now to Figure 3, this shows the waveforms of voltages whereby the time required for each digit period may be reduced. It will be seen from Figure 3(*a*) that the repetition period of the dot pulses is 7 microseconds instead of the 10 microseconds in Figure 2(*a*), the duration of each dot pulse being 1.5 microseconds which is the same as in Figure 2(*a*). The dash waveform shown in Figure 3(*b*) contains an initial pulse of 1.5 microseconds followed by a meditation pulse of 1.5 microseconds and a dash pulse of 2 microseconds. Thus the total digit time is 5 microseconds which allows 2 microseconds in which to move the beam on to the next storage area. The X time base is shown in Figure 3(*d*).

It will be seen that the two pulses in the dash waveform are of different amplitudes. The initial, 1.5 microseconds pulse may be for example of 50 volts and the dash pulse of 2 microseconds may be for example 70 volts. The beam is defocused during the initial 1.5 microseconds pulse and is brought progressively from the defocused condition to the focused condition during the 2 microseconds dash pulse, as will be seen from Figure 3(*c*). Thus during the reading phase the beam is defocused and of relatively low intensity and during the modifying phase the beam is of relatively high intensity and is brought gradually to the focused condition. The beam intensity during the reading phase is the normal intensity appropriate to the operation of electrostatic storage apparatus as described in the aforesaid co-pending patent applications. Owing to the increased intensity of the beam during the two microseconds dash pulse the time required to effect the refilling process is reduced.

The circuit for obtaining the waveform of Figure 3(*b*) may be as shown in Figure 4. The circuit of Figure 4 differs from that of Figure 4 in application No. 165,262, now Patent No. 2,769,935 only in the arrangement of the control grid circuit of the valve $V_{15}$. The voltage shown in Figure 3(*b*) appears at the output terminal 36 of Figure 4 and the circuit is an anode follower in which the anode of the valve $V_{15}$ is coupled to the control grid circuit thereof through a feedback circuit including a cathode follower stage comprising two valves $V_{16}$ and $V_{17}$. The potential of the terminal 36 is determined by the current flowing in the feedback path and this current in turn is dependent upon the impedance between the anode of the diode $D_{21}$ and earth. When the two diodes $D_{21}$ and $D_{41}$ are conducting the impedance between the anode of the diode $D_{21}$ and earth is determined mainly by the values of $R_1$, $R_2$ and $R_3$ connected in parallel. When these conditions exists the potential of the terminal 36 is the datum potential shown in Figure 3(*b*). When the diode $D_{21}$ is conducting and the diode $D_{41}$ is non-conducting the impedance between the anode of the diode $D_{21}$ and earth is determined mainly by the resistors $R_1$ and $R_2$ connected in parallel. When these conditions exist the potential of the terminal 36 is say 50 volts. When the diode $D_{41}$ is conducting and the diode $D_{21}$ is non-conducting the impedance between the anode of the diode $D_{21}$ and earth is determined mainly by the resistors $R_2$ and $R_3$ connected in parallel. When these conditions exist the potential of the terminal 36 is say 70 volts.

Negative-going dot pulses as shown in Figure 3(*e*) are applied to the anode of a diode $D_{43}$ whose cathode is connected to the cathode of the diode $D_{21}$ and through $R_1$ to a terminal 34 at a potential of —300 volts. In the absence of a dot pulse at the anode of the diode $D_{43}$ this diode conducts and the potential of the cathode of the diode $D_{21}$ is less negative than —300 volts. The anode of the diode $D_{21}$ is connected through $R_2$ to the terminal 35 which is at —300 volts and hence under these conditions the diode $D_{21}$ is conducting.

Negative-going pulses as shown in Figure 3(*f*) are applied through a terminal 37 to the anode of a diode $D_{42}$ whose cathode is connected to the cathode of the diode $D_{41}$ and through the resistor $R_3$ to the terminal 38 which is at —300 volts. In the absence of a negative-going pulse at the anode of the diode $D_{42}$ this valve is conducting and the potential of the cathode of the diode $D_{41}$ is less negative than —300 volts. Thus under these conditions this diode is conducting.

When a negative-going dot pulse is applied to the anode of the diode $D_{43}$ this diode becomes non-conducting and hence the diode $D_{21}$ likewise becomes non-conducting. Similarly when the negative-going pulse shown in Figure 3(*f*) is applied to the anode of the diode $D_{42}$ this diode becomes non-conducting and the diode $D_{41}$ as a result also become non-conducting.

The pulses shown in Figure 3(*f*) may be said to be in the form of a dash pulse minus a meditation pulse minus a dot pulse and may be formed in any suitable way by combining a dash pulse with a meditation pulse and a dot pulse. For example the dash pulse may be applied to the control grid of a pentode valve and the dot pulse and meditation pulse applied to the suppressor grid through isolating rectifiers. Such an arrangement may be made such that in the absence of a dash pulse on the control grid of the valve no current flows through the valve and that during the presence of a dot pulse and during the presence of a meditation pulse on the suppressor grid of the valve the valve is likewise non-conducting despite the presence of a dash pulse on the control grid of the valve. Thus when a dash pulse is applied to the control grid of the valve current flows in the valve only during that part of the dash pulse during which a dot pulse and the meditation pulse are absent.

As explained in the specification of patent application No. 124,192 the change in spot size or focus produced by variation of the beam intensity may be adequate to produce the defocus-focus effect required. Thus, if a system is operated with a dash bright-up waveform as shown in Figure 3(*b*) the operating conditions may be so adjusted that the spot produced by the dot portion is defocused whereas the spot produced by the extended bright-up pulse of increased amplitude is focused. The leading edge of the extended bright-up pulse may then be shaped in any suitable manner so as to ensure that the change from the defocused condition of the beam to the focused condition takes place progressively. For example the shape illustrated by the broken line in the Figure 3(*b*) may be used. The method of producing a pulse of this shape is so well known to those skilled in the art that it is unnecessary to describe a suitable circuit.

We claim:

1. Apparatus for the electrostatic storage of information comprising an evacuated envelope, an electrostatic storage surface and electron beam producing means in said envelope, timing means, a stepped waveform generator controlled by said timing means, means adjacent the beam and coupled to said generator for directing said beam at recurring time intervals toward an area of said surface, each said time interval including a first portion followed by a second portion and said second portion being at least one fifth of said time interval, switching and focus control means for said beam, positioned to switch the beam into and out of operation and to vary the degree of focus of the beam, voltage generating means coupled to said timing means and generating pulses locked by said timing means in predetermined time relation to said stepped waveform to switch the beam into operation during at least part of each of said time interval portions, and to maintain a low degree of focus during said first interval portion, and to increase the degree of focus gradually during said second interval portion, said gradual increase occupying a time which is a substantial fraction of said second interval portion, circuit means including gating means coupling said voltage generating means to said switching and focus control means and operative during said first interval portion, a pick-up plate capacitively coupled to said surface to have generated therein a read voltage representative of the state of charge of said area, and means coupling said pick-up plate to said gating means to render said circuit means selectively operative during said second interval portion in response to a predetermined condition of said read voltage.

2. Apparatus for the electrostatic storage of information comprising an evacuated envelope, an electrostatic storage surface and electron beam producing means in said envelope, a stepped waveform generator, means adjacent the beam and coupled to said generator for directing said beam at recurring time intervals toward an area of said surface, timing means for controlling said stepped waveform generator so that each said time interval includes a first portion followed by a second portion and said second portion being at least one fifth of said time interval, a beam intensity control electrode, a beam focus control electrode, first generating means controlled by said timing means generating a switching waveform to switch the beam into operation during at least part of each of said time interval portions, second generating means controlled by said timing means generating a focus control voltage of substantially constant value during said first interval portion and a gradually changing voltage to increase the degree of focus during said second interval portion, said gradual increase occupying a time which is a substantial fraction of said second interval portion, circuit means including gating means coupling said first generating means to said beam intensity control electrode and said second generating means to said beam focus control electrode during said first interval portion, a pick-up plate capacitively coupled to said surface to have generated therein a read voltage representative of the state of charge of said area, and means coupling said pick-up plate to said gating means to render said circuit means selectively operative during said second interval portion in response to a predetermined condition of said read voltage.

3. Apparatus according to claim 1, wherein said substantial fraction is at least one-fifth.

4. Apparatus according to claim 1, wherein said substantial fraction is substantially one-half.

5. Apparatus according to claim 2, wherein said substantial fraction is at least one-fifth.

6. Apparatus according to claim 2, wherein said substantial fraction is substantially one-half.

7. Apparatus for the two-state storage of digital information in a cathode ray tube storage device, which comprises a cathode ray tube, a cathode ray beam producing means, and an electrostatic storage surface, means for setting up upon a discrete area of said electrostatic storage surface a first state of electrostatic charge distribution by bombarding said area with said cathode ray beam in a first state of focus, means for gradually changing the state of focus of said beam while said beam is on, from said first state to a second state for further bombardment of said area when required by the nature of the information to be stored, said beam when in said second state of focus being more sharply focused than when in said first state of focus, said means for gradually changing the state of focus including means to effect said change in a time which is at least one-fifth of the duration of said further bombardment.

8. Apparatus according to claim 7, including means for gradually changing the magnitude of a focusing control voltage for gradually changing the focus of said beam from said first state to said second state.

9. Apparatus according to claim 7, including means for reducing the intensity of said beam after bombardment of said area by said beam in its first state of focus and subsequently increasing the intensity of said beam before said gradual change takes place.

10. Apparatus according to claim 7, including means for gradually increasing the intensity of said beam to gradually change the state of focus of said beam.

11. Apparatus for the storage of binary digital information in a cathode ray tube storage device, wherein information is stored on discrete areas of a storage surface as electrostatic charges and wherein information of one kind is stored as a charge produced upon the storage area by a beam of large cross-section, and information of the other kind is stored as a charge produced upon the storage area by a first bombardment of the area during a first phase by a beam of large cross-section to produce a charge which is subsequently, during a second phase, modified by bombardment with a beam of smaller cross-section obtained by focusing, said apparatus including means for changing the state of focus of the beam from the first defocused state corresponding to the first phase to the more sharply focused state corresponding to the second phase while the beam is on to produce the modifying bombardment, said means including control means to gradually change the state of the beam during the period that the beam is on for said modifying bombardment, the time interval occupied by the change in state of the beam being at least one-fifth of said period.

12. Apparatus as claimed in claim 11, in which the time interval occupied by the change in state of the beam is a major part of said period.

References Cited in the file of this patent

UNITED STATES PATENTS

| | | |
|---|---|---|
| 2,358,902 | Ziebolz | Sept. 26, 1944 |
| 2,437,173 | Rutherford | Mar. 2, 1948 |
| 2,438,709 | Labin et al. | Mar. 30, 1948 |
| 2,454,410 | Snyder | Nov. 23, 1948 |
| 2,472,165 | Mankin | June 7, 1949 |
| 2,560,585 | McMillan | July 17, 1951 |
| 2,589,460 | Tuller | Mar. 18, 1952 |